United States Patent
Nordberg et al.

(10) Patent No.: US 8,118,238 B2
(45) Date of Patent: Feb. 21, 2012

(54) USER INTERFACE FOR BUILDING CONTROLLER

(75) Inventors: Timothy J. Nordberg, Edina, MN (US); Nathan Longen, White Bear Township, MN (US)

(73) Assignee: Honeywell International Inc., Morristown, NJ (US)

( * ) Notice: Subject to any disclaimer, the term of this patent is extended or adjusted under 35 U.S.C. 154(b) by 527 days.

(21) Appl. No.: 12/332,156

(22) Filed: Dec. 10, 2008

(65) Prior Publication Data
US 2010/0140364 A1 Jun. 10, 2010

(51) Int. Cl.
*G05D 23/00* (2006.01)
*G05B 15/00* (2006.01)
*G05B 9/02* (2006.01)

(52) U.S. Cl. .................... 236/51; 700/1; 700/79

(58) Field of Classification Search .............. 236/51, 236/21 R, 94; 700/1, 3, 79–82; 710/301, 710/313
See application file for complete search history.

(56) References Cited

U.S. PATENT DOCUMENTS

| | | | |
|---|---|---|---|
| 5,748,466 A | 5/1998 | McGivern et al. | |
| 5,949,497 A | 9/1999 | Back | |
| 6,059,195 A | 5/2000 | Adams et al. | |
| 6,101,419 A | 8/2000 | Kennedy et al. | |
| 6,129,284 A | 10/2000 | Adams et al. | |
| 7,146,445 B2 | 12/2006 | Appleton et al. | |
| 7,242,116 B2 | 7/2007 | Kawazu et al. | |
| 2005/0083965 A1 | 4/2005 | Sodergren | |
| 2006/0272830 A1 | 12/2006 | Fima | |

*Primary Examiner* — Chen Wen Jiang
(74) *Attorney, Agent, or Firm* — Seager Tufte & Wickhem LLC (57) ABSTRACT

A user interface for a building appliance controller that may include a control panel and one or more option cards. The user interface may allow a user or technician to program, modify, and/or view one or more parameters of the control panel and/or the one or more option cards. In some cases, the control panel may be configured to send one or more messages to a selected option card that indicate an input at the user interface, and in response, the selected option card may send one or more messages to the control panel that indicate display information for display on the user interface of the control panel. In some embodiments, such as when the user interface includes a segmented display, the display information may include the on/off state of the various segments of the display.

21 Claims, 5 Drawing Sheets

USER INTERFACE FOR BUILDING CONTROLLER

FIELD

The present disclosure relates generally to building appliance controllers, and more particularly, to user interfaces for building appliance controllers.

BACKGROUND

Building appliances are commonly used to help manage and/or control environmental and/or other parameters within a building. In many installations, a building appliance controller is used to control one or more building appliances. Example building appliances may include forced air furnaces, boilers, water heaters, heat pumps, and/or other building appliances. There is an ongoing need to provide alternative user interfaces for such building appliance controllers.

SUMMARY

The present disclosure relates generally to building appliance controllers, and more particularly, to user interfaces for building appliance controllers. In one illustrative embodiment, a building appliance controller includes a control panel and one or more option cards. In some cases, the control panel may include a processor (e.g. microprocessor, microcontroller, etc.) and/or other hardware and/or software that is configured to allow additional functionality to be added with option cards. Each of the one or more option cards may each include a processor (e.g. microprocessor, microcontroller, etc.) and/or other hardware and/or software that is configured to provide additional functionality to the control panel. The use of option cards may, for example, allow more flexibility in the functionality and the ability to mix and match desired functionality of the building appliance controller to the needs of a particular installation.

In some cases, the control panel may include a user interface that allows a user or technician to program, modify, and/or view one or more parameters of the control panel and/or the one or more option cards. In some embodiments, and in response to a user input at the user interface, the control panel may send one or more messages or other signals to a selected option card(s) that communicates the user input at the user interface of the control panel, and the selected option card(s) may return one or more messages or other signals that indicate display information for the user interface of the control panel. In one example, the user interface of the control panel may include a fixed segment display and, in this example, the display information provided by the selected option card may include the on/off state for each of the segments of the fixed segment display. In this or another example, the user interface may include one or more buttons, and the one or more messages or other signals sent to the selected option card(s) may indicate which button(s) were pressed by the user or technician. As such, and in some illustrative embodiments, each or selected option cards may use the user interface of the control panel to allow a user or technician to program, modify, and/or view one or more parameters of the corresponding option card. Also, and in some cases, each option card may control the user interface in a manner that accommodates the particular parameters and/or functionality of the option card.

The preceding summary is provided to facilitate a general understanding of some of the innovative features unique to the present disclosure and is not intended to be a full description. A full appreciation of the disclosure can be gained by taking the entire specification, claims, drawings, and abstract as a whole.

BRIEF DESCRIPTION

The disclosure may be more completely understood in consideration of the following detailed description of various illustrative embodiments of the disclosure in connection with the accompanying drawings, in which.

DETAILED DESCRIPTION

The following description should be read with reference to the drawings wherein like reference numerals indicate like elements throughout the several views. The detailed description and drawings show several embodiments which are meant to be illustrative of the claimed invention.

Figure 1:
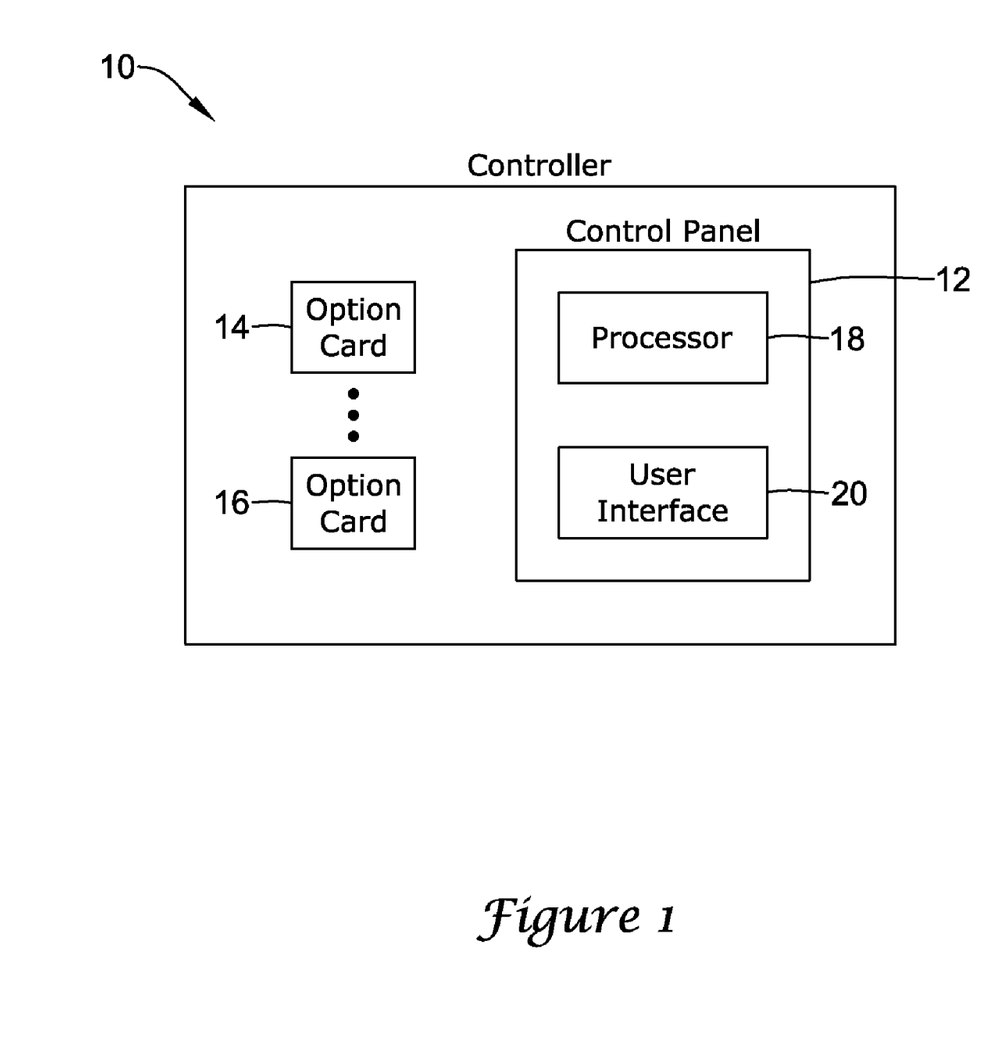
FIG. 1 is a block diagram of an illustrative controller for a heating, ventilation, and air conditioning (HVAC) appliance.

FIG. 1 is a block diagram of an illustrative controller 10 for a heating, ventilation, and air conditioning (HVAC) component. In the illustrative embodiment, the controller 10 may include a control panel 12 and one or more option cards 14 and 16. The one or more option cards 14 and 16 may be provided in slots in the controller 10, and may be removable, if desired. The control panel 12 may include a processor 18 (e.g. microprocessor, microcontroller, etc.) and/or other hardware and/or software that is configured to allow additional functionality to be added with option cards. The one or more option cards 14 and 16 may each include a processor (e.g. microprocessor, microcontroller, etc.) and/or other hardware and/or software that is configured to provide additional functionality to the appliance controller 10.

Example HVAC components that may be controlled by illustrative controller 10 can include, but are not limited to, forced air furnaces, boilers, water heaters, heat pumps, and other gas-fired HVAC appliances. In one example, if the HVAC component is a boiler, the option cards 14 and 16 may be configured to add additional functionality to the appliance controller 10, such as, additional temperature sensing, temperature setpoints, low water cutoff, mixing control, boiler staging, boiler reset with DW priority, as well as additional functionality or combination of functionality, as desired. The use of option cards 14 and 16 may allow more flexibility in the functionality and the ability to mix and match desired functionality of the building appliance controller 10 to the needs of a particular installation.

The control panel 12 may also include a user interface 20 that may allow a user or technician to program, modify, and/or view one or more parameters of control panel 12 and/or one or more option cards 14 and 16, such as programming and/or schedule parameters, as desired. In one illustrative embodiment, some or all of these parameters may be received via a user interface 20 of control panel 12 from a user or technician, and when appropriate, transmitted to the one or more option cards 14 and 16. In some cases, parameters and/or menus of the one or more option cards 14 and 16 may be received from the one or more option cards 14 and 16 and displayed on the user interface 20 of the control panel 12 for a user or technician to view and/or interact with.

While the illustrative example of FIG. 1 describes an appliance controller 10 that includes a control panel 12 and one or more option cards 14 and 16, it is contemplated that the features of this disclosure may be implemented in any suitable controller that includes, for example, a control panel with one or more other controllers that are configured to communicate and add functionality to the control panel.

Figure 2:
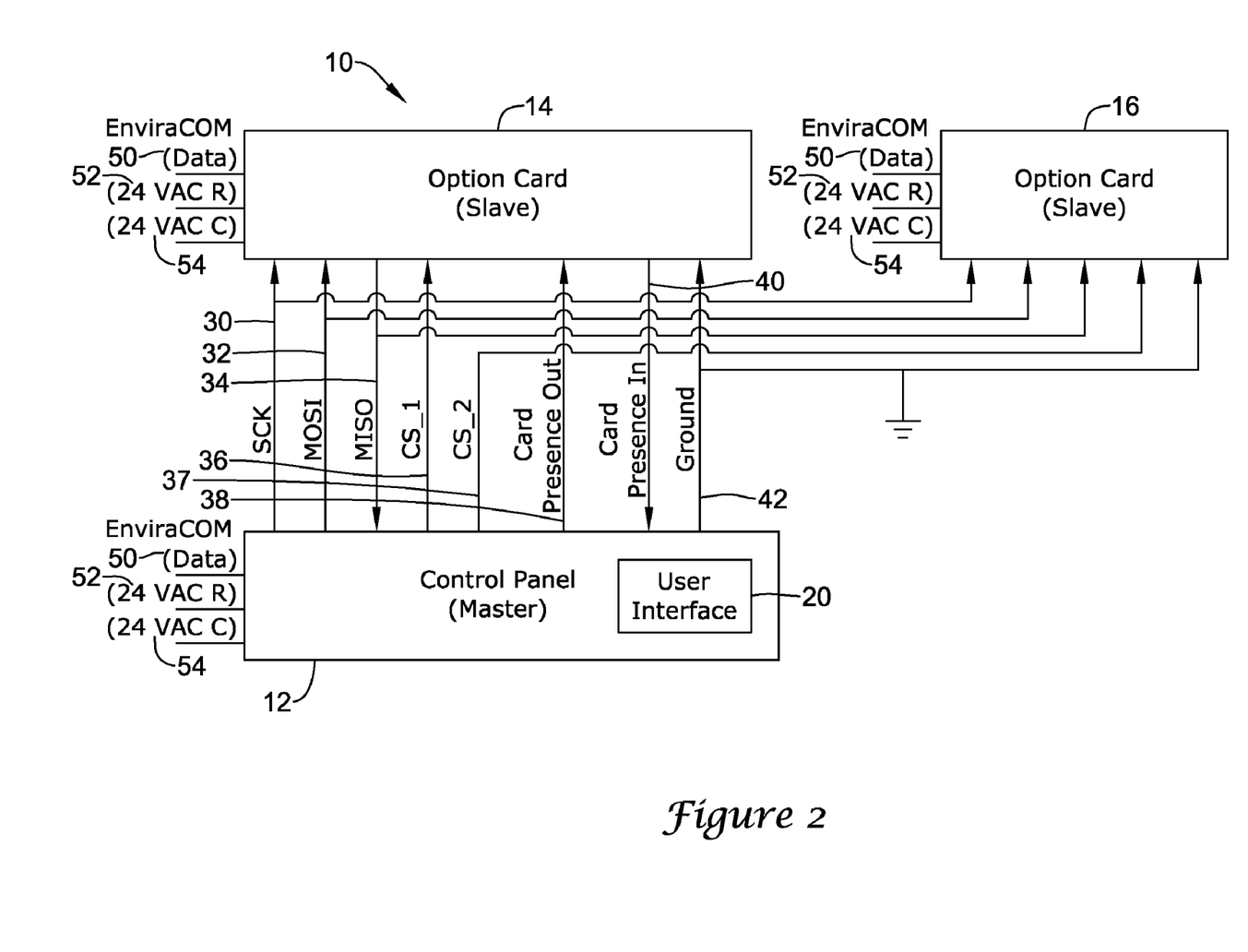
FIG. 2 is a schematic diagram of the illustrative controller of FIG. 1.

FIG. 2 is a schematic diagram of the illustrative controller 10 of FIG. 1. In the illustrative embodiment, the controller 10 may include a control panel 12 (e.g. including a motherboard) and one or more option cards 14 and 16 (e.g. including daughter cards). The control panel 12 and one or more option cards 14 and 16 may be configured to control the operation and/or functionality of an HVAC component.

In the example shown in FIG. 2, two option cards 14 and 16 are provided. However, in some cases, fewer or additional option cards may be added to the controller 10, as desired. Option cards 14 and 16 may implement and/or add additional functionality and/or control to the control panel 12. Additional functionality may include, but is not limited to, additional aquastats, low water cutoff, flue limit, mixing control, boiler staging, boiler reset with DW priority, as well as any other functionality or combination of functions, as desired. In some cases, the option cards 14 and 16 may be configured to auto reset or may require manual reset, as desired. In one example, the control panel 12 may be configured to receive up to three option cards 14 and 16, however, it is contemplated that the control panel 12 may be configured to receive more or less option cards, as desired. In some cases, the option cards may be of a uniform size or varying sizes, as desired.

In the illustrative embodiment of FIG. 2, the control panel 12 may include one or more interfaces configured to communicate with the one or more option cards 14 and 16. For example, the interface between the control panel 12 and each of the option cards 14 and 16 may include an EnviraCOM™ connection, a Serial Peripheral Interface (SPI) connection, a ground connection, a card presence connection, and/or any other suitable connection.

The EnviraCOM™ connection can operate in accordance with a 3-wire communication protocol that allows the connected controllers to, for example, publish information relating to status, alarms, etc. on a building control network. The information may include flame signal strength or resistance, number of cycles, run time, alarm information, diagnostics information, etc. In the illustrative example, the EnviraCOM™ connection may include a three pin connection that includes a data wire 50, a 24 VAC R wire 52, and a 24 VAC C wire 54. The data wire 50 may be a bi-directional data line used for EnviraCOM™ communications. The 24 VAC connections 52 and 54 may provide power to the option cards 14 and 16. The 24 VAC R wire 52 may be a connection to a R terminal of a 24 volt AC transformer (not shown). The 24 VAC C wire 54 may be a connection to a C terminal of the 24 volt AC transformer (not shown).

In the illustrative embodiment, the SPI connection may include a three-wire interface of the control panel 12 that may be common to all the option cards 14 and 16. The SPI connection may be used to communicate messages between the control panel 12 and the option cards 14 and 16. Example data that may be communicated between the control panel 12 and the option cards 14 and 16 may include display configuration information, such as display and button use (shown in FIG. 3) and/or a safety key "handshake" to keep the safety limit string closed (not shown). The three-wire SPI interface can include, for example, a serial clock (SCK) port 30, a Master Output Slave Input (MOSI) port 32, and a Master Input Slave Output (MISO) port 34.

The SPI interface may also include one or more card select (CS_X) ports 36 and 37 that may be used to select one of the option cards 14 and 16, respectively. For example, option card 14 may be coupled to CS_1 and option card 16 may be coupled to CS_2. In this example, the card select ports 36 and 37 may implement 0-5 volt digital logic to indicate the selected card. For example, when the respective card select signal 36 or 37 is pulled low (e.g. zero volts), it may signal to the corresponding option card 14 or 16 that the option card 14 or 16 is the desired recipient of the data on the SPI connection. In some cases, the SPI communication may implement 0-5 volt digital logic for communication, if desired.

In the illustrative embodiment, the control panel 12 may be the "master" and the options cards 14 and 16 may be the "slaves". In this case, the control panel 12 may be the master of communication over the SPI connection. The control panel 12 may drive the clock signal, place data on the MOSI line for the option cards 14 and 16 to read, and read the MISO line for input data received from the option cards 14 and 16. In one example, the SPI clock may be generated from the control panel 12 (e.g. master) at a rate of 62,500 bits per second ±15%. However, any suitable clock may be used, as desired.

In one example communication method, the control panel 12 (e.g. master) may initiate communication with option card 14 or option card 16 by driving the respective CS_X line 36 or 37 low. The control panel 12 may then serially transmit a message to the selected option card 14 or 16 (e.g. slave). The message may be sent serially one (1) bit at a time with a short idle gap between bits, such as less than 1 milliseconds, or less than 350 microseconds, as desired. The CS_X line may remain low until the master finishes transferring an entire message packet to the selected slave. At the end of the message, the SPI bus may be idle for at least one line cycle before the control panel 12 drives the clock signal to receive a response from an option card 14 or 16.

In the illustrative embodiment, the control panel 12 and the option cards 14 and 16 may communicate using a defined message packet. In some cases, the message packet may include a header field, a length field, a data field, and a cyclic redundancy check (CRC) field. In one example, the message packet may include a one byte header field, a one byte length field, a "N" byte data field (where N is any integer), and a two byte 16-bit CRC checksum. However, it is contemplated that any suitable communication protocol may be used, including those communication protocols approved by UL to meet UL1998 standards, as desired.

Each option card 14 and 16 may be connected to a Card Presence Out line and a Card Presence In line, if desired. In FIG. 2, only card 14 includes a Card Presence Out line 38 and a Card Presence In line 40. However, it is contemplated that card 16 may also include a Card Presence Out line and a Card Presence In line. The Card Presence Out line(s) and Card Presence In line(s) may be used by the control panel 12 to determine when a specific option card 14 or 16 is present. Each of the option cards 14 and 16 may simply short the corresponding Card Presence Out line and Card Presence In line so that the control panel 12 may place a voltage on the Card Presence Out wire 38 and sense a voltage on the Card Presence In wire 40 to determine if the corresponding option card 14 and 16 is connected.

Figure 3:
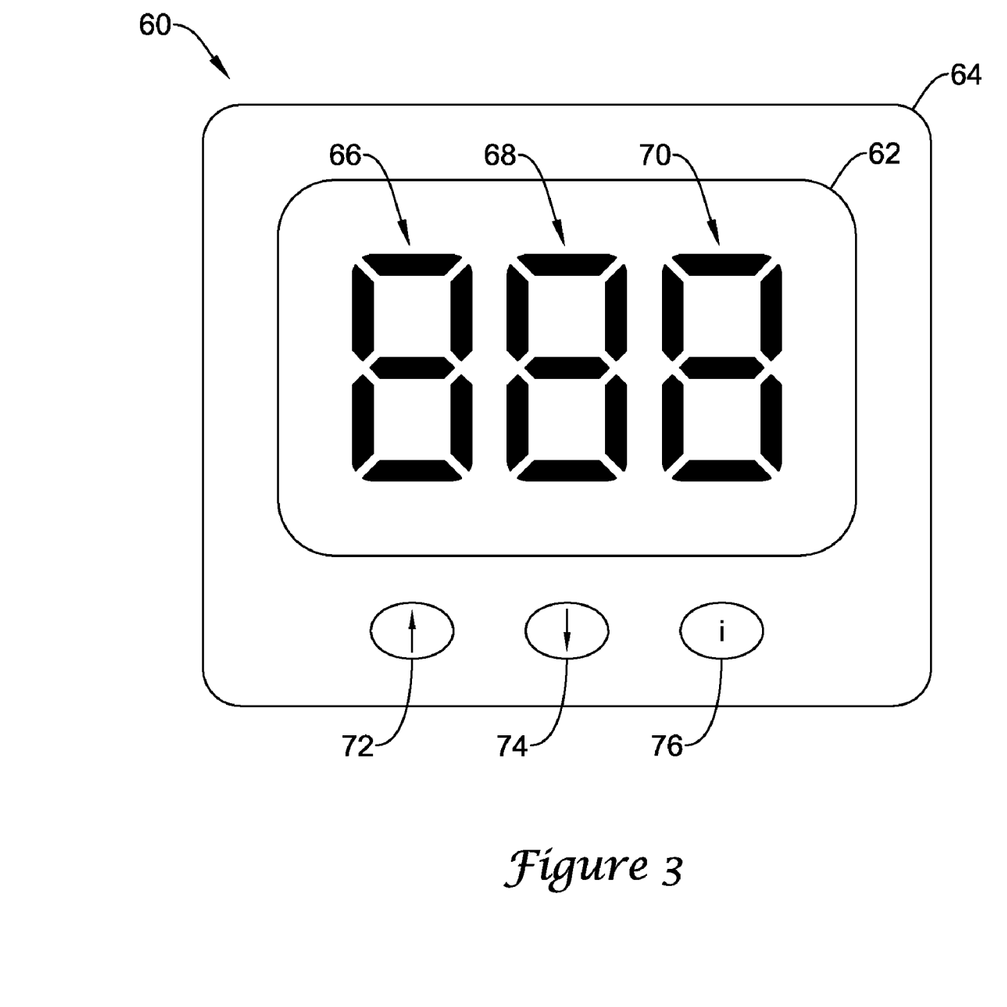
FIG. 3 is a perspective view of an illustrative user interface for the control panel of the controller of FIG. 1.

FIG. 3 is a perspective view of an illustrative user interface 60 for the control panel 12 of controller 10 of FIG. 1. The illustrative user interface 60 may allow a user or technician to program, modify, and/or view one or more parameters or menus of control panel 12 and/or one or more option cards 14 and 16. As illustrative, the user interface 60 may include a housing 64 containing a display 62 and one or more buttons 72, 74, and 76. In the illustrative embodiment, three buttons 72, 74, and 76 are provided, however, any suitable number of buttons may be provided, as desired. In some cases, the display 62 may be a touch screen display, and when so provided, separate buttons may not be provided, if desired.

In the illustrative embodiment, the display 62 may be a 3-digit, 7-segment display configured to display information related to the control panel 12 and/or one or more option cards 14 and 16. Although not shown in FIG. 2, the display 62 may include a decimal point between each of the digits 66, 68, and 70, if desired. Buttons 72, 74, and 76 may allow a user or technician to enter information, traverse through a menu of the control panel 12 and/or one or more option cards 14 and 16, and/or adjust parameters of the control panel 12 and/or one or more option cards 14 and 16. In the illustrative example, each of the buttons 72, 74, and 76 may include an identifier. For example, button 72 may include an up arrow "↑" identifier, button 74 may include a down arrow "↓" identifier, and button 76 may correspond to an "i" identifier. However, the foregoing identifiers are merely illustrative and it is contemplated that any suitable identifier or no identifier at all may be used, as desired.

When a user or technician interacts with the user interface of the control panel 12, the control panel 12 may respond by sending the user entered input to the appropriate option card 14 or 16 over, for example, the SPI interface. In some cases, the only menu structure that may be stored in the control panel 12 may be a top-level menu that may allow a user to select an option card 14 or 16 that is in communication with or connected to the control panel 12. In some cases, some or all other user menus may be stored or otherwise contained within the option cards 14 and 16. As such, each option card 14 and 16 may be able to have a unique list of parameters and/or menu structures that may not need to be known or stored by the control panel 12. In some cases, the control panel 12 may also store a menu structure that can be used to set or display one or more parameters of the control panel 12, if desired.

When a user or technician presses one of buttons 72, 74, or 76, the control panel 12 may send a Button Event message to the selected option card 14 or 16 to indicate that a button event has occurred. In one example, the control panel 12 may send the option card a one (1) byte value to indicate that the button event has occurred, and which button 72, 74, or 76 was pressed. The selected option card 14 or 16 may then adjust its internal menu structure accordingly. The selected option card 14 or 16 may then respond with the proper Display Data message. In some cases, the Display Data message may include the on/off state of each segment of the 3-digit, 7-segment display. In one example, the Display Data message may only include the on/off state of each segment of the 3-digit, 7-segment display, but this is not required in all embodiments.

In an illustrative example, the control panel 12 may send the selected option card 14 or 16 a Button Event message including a "Start" flag, a "3-button hold" flag, or a "Refresh" flag when one of buttons 72, 74, and/or 76 is pressed. The "Start" flag may indicate to the option card 14 or 16 to send display data for the option cards 14 or 16 main menu or first menu layer.

The "3-button hold" flag may indicate that the user has held all three buttons 72, 74, and 76 down for a period of time, such as for example, two seconds, three second, four seconds, five seconds, or any other period of time, as desired. In response to the "3-button hold" when the main menu or first menu layer of the option card 14 or 16 is displayed, the option card 14 or 16 may either enter or exit "Installer" mode in which an installer may set and/or adjust the parameters of the control panel 14 or 16. For example, if the option card 14 or 16 is in "Reading" mode, in which the installer and/or user can view the parameter options, the option card 14 or 16 can enter "Installer" mode and send the appropriate display data to the control panel 12. If the option card 14 or 16 is in "Installer" mode, the option card 14 or 16 can enter "Reading" mode and send the appropriate display data to the control panel 12. In some cases, if the option card 14 or 16 remains in "Installer" mode for a duration of time, such as for example, five minutes without receiving any Button Event message(s), the option card 14 or 16 may return to the "Reading" mode.

The "Refresh" flag may indicate that the option card 14 or 16 should update its display data. In essence, the option card 14 or 16 may simply send the Display Data message containing the current data that is to be displayed. This message may allow the control panel 12 to periodically be updated with new values if the current menu item is displaying a real time value that could be changing (e.g. sensor temperature).

In some cases, the information that the option card 14 or 16 wants to display may not fit in the 3 digit display 62. In this situation, multiple pages of display data can be sent to the control panel 12 at a time, where a page is considered to be data that can be displayed on the 3-digit display at the same time. If the display data includes only one page, the control panel 12 may simply display the one page data. However, if the display data includes two or more pages, the control panel 12 may cycle through displaying each page of data.

Figure 4:
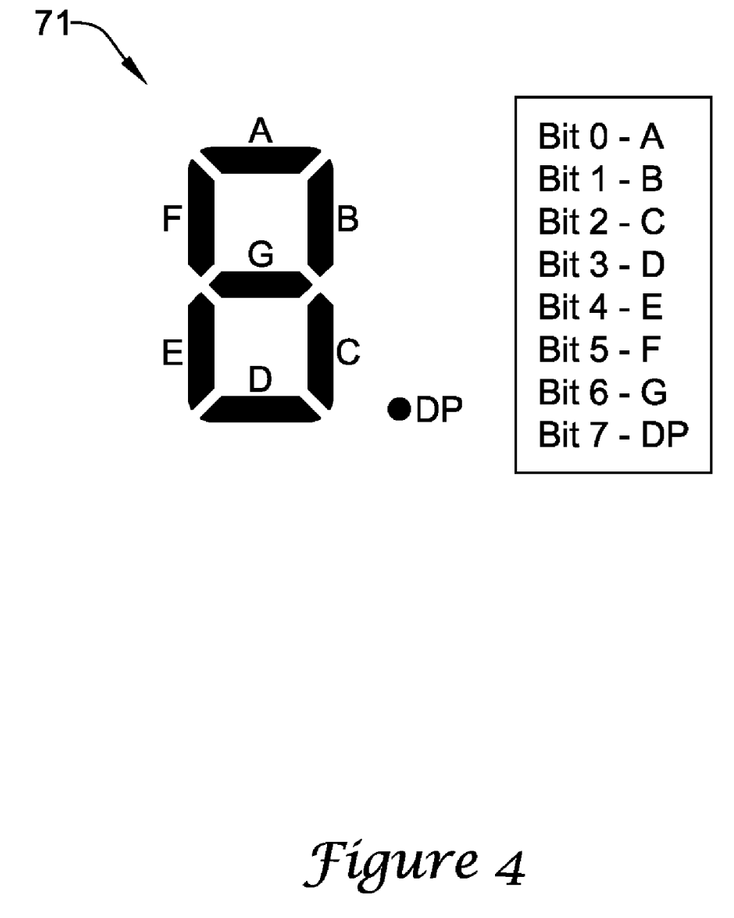
FIG. 4 is an illustrative view of a digit of the display shown in FIG. 3.

FIG. 4 is an illustrative digit 71 for the display 62 of FIG. 3. When the option cards 14 and 16 respond to the Button Event message with a Display Data message, the display data message may indicate which segments of the display should be displayed or, in other words, the on/off state of each segment of the digit 71. For example, the option card 14 or 16 may send a three (3) byte value (for the 3-digit display) where each byte represents one 7-segment digit and decimal point for each page of data to be displayed. Each individual bit in each data byte may represent a state of a specific segment. For example, the top segment may be "A", the top right segment may be "B", the bottom right segment may be "C", the bottom segment may be "D", the bottom left segment may be "E", the top left segment may be "F", and the middle segment may be "G". The decimal point may be "DP". Each segment may correspond to a bit. For example, bit 0 may correspond to "A", bit 1 may correspond to "B", bit 2 may correspond to "C", bit 3 may correspond to "D", bit 4 may correspond to "E", but 5 may correspond to "F", bit 6 may correspond to "G", and bit 7 may correspond to "DP". The on/off state of each segment may be determined using digital logic. A value of "1" for a bit indicates that a specific segment shall be on and a value of "0" indicates that a specific segment shall be off. Also, the option card 14 and 16 can send a Display Data message with length of zero bytes, which indicates to the control panel 12 that the menu of the option card 14 or 16 has been exited, which can be referred to as a "Done" message.

Figure 5:
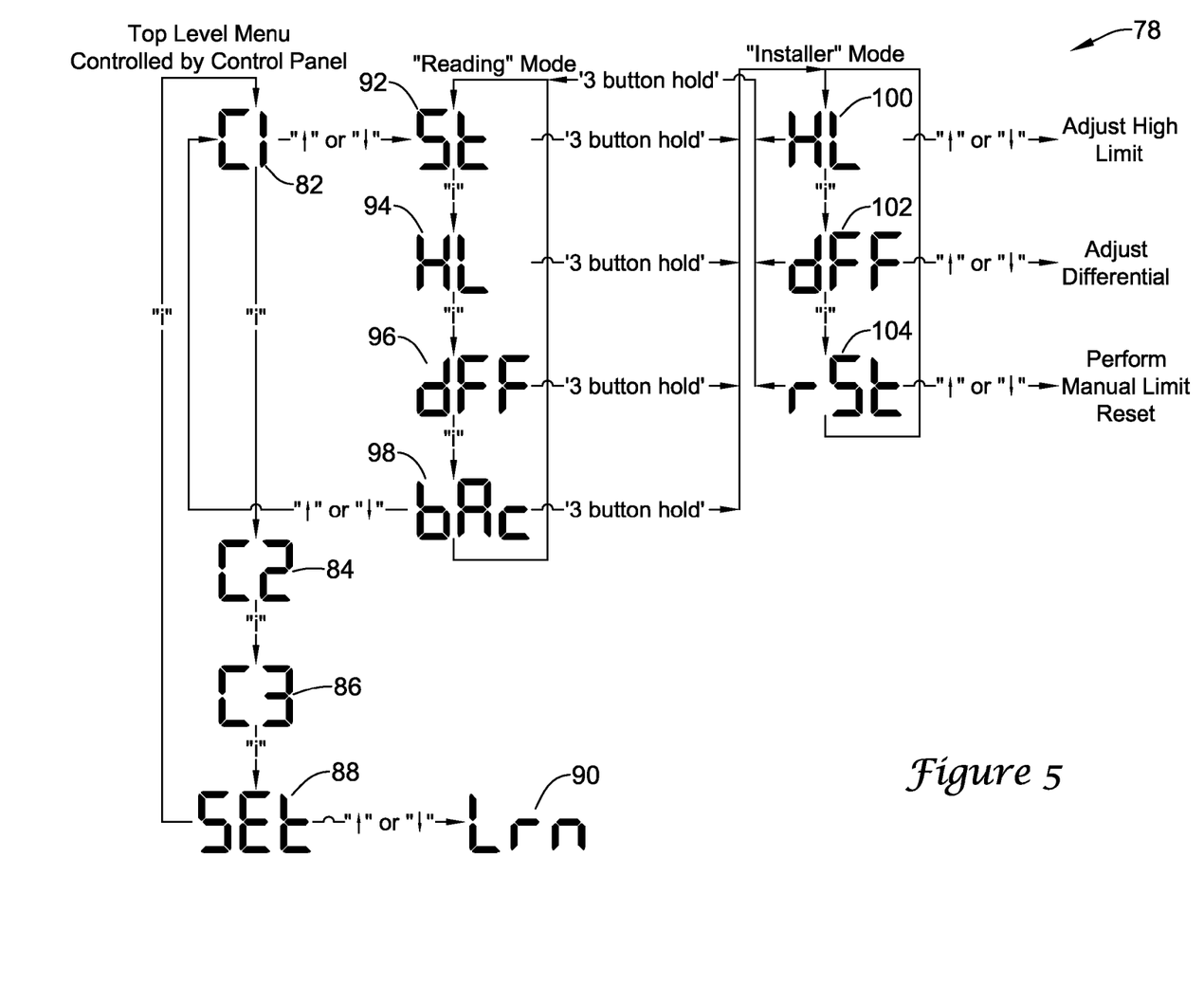
FIG. 5 is an illustrative menu that may be displayed on the user interface of the controller of FIG. 1.

FIG. 5 is an illustrative menu 78 that may be displayed on the user interface of the controller 10 of FIG. 1. As illustrated, the control panel 12 may display a top level menu that may allow a user or technician to toggle through a list of option cards 14 and 16 that are in communication with or connected to the control panel 12. In some cases, the control panel 12 may determine which option cards 14 and 16 are connected via the Card Presence connection lines shown in FIG. 2. When displaying the list of option cards 14 and 16, the top level menu may, for example, sequentially display available option cards 14 and 16 with each button touch. In the illustrative example, "C1" 82 may correspond to a first option card, "C2" 84 may correspond to a second option card, "C3" 86 may correspond to a third option card, and "SEt" 88 may allow a user or technician to add additional option cards. As such, a user may sequentially scroll through this list of option cards by pressing the "i" button 76, shown in FIG. 3.

In the illustrative embodiment, if a user presses the up arrow "↑" button 72 or the down arrow "↓" button 74 when a particular option card is displayed, a "Reading" mode may be entered for the displayed option card. In addition, when button 72 or 74 is pressed, the control panel 12 may send the displayed option card a Button Event message including a "Start" flag, which indicates that the displayed option card has been selected by the user. The selected option card may send the control panel 12 a Display Data message including display information for the "Reading" mode.

At the top level menu controlled by the control panel 12, a user may enter the setup menu by pressing "↑" button 72 or "↓" button 74 when "SEt" 88 is displayed. Also, the control panel 12 may display learning "Lrn" 90, indicating that the control panel can be forced to search for new option cards by pressing "↑" button 72 or "↓" button 74.

In the illustrative embodiment, when in the "Reading" mode, a user may cycle through a list of parameters of the option card by pressing the "i" button 76. If at any time in the "Reading" mode, the user presses and holds all three buttons (3-button hold), the "Installer" mode may be entered. For example, as illustrated in FIG. 5, in the "Reading" mode for option card "C1" 82, a user may cycle through a sensor temperature "St" 92, a high limit parameter "HL" 94, a differential parameter "dFF" 96, and a back "bAc" 98, which a user may toggle through by pressing "i" button 76. If the user presses "↑" button 72 or "↓" button 74 when "bAc" 98 is displayed, the display may return to the top level menu of the control panel 12. If the user presses all three buttons 72, 74, and 76 (3-button hold) while any of "St" 92, "HL" 94, "dFF" 96, and "bAc" 98 are displayed, the "Installer" mode of the selected option card may be entered.

The "Installer" mode may allow a user to set and/or adjust the parameters of the option card. In the illustrative example, the "Installer" mode menu may include a high limit parameter display "HL" 100, a differential parameter display "dFF" 102, and a manual reset display "rSt" 104 that the user may toggle through by pressing "i" button 76. To adjust any of the parameters, the user may press "↑" button 72 or "↓" button 74. For example, when "HL" 100 or "dFF" 102 are displayed, the option card may display the actual parameter setting on the display, which the user may then adjust by pressing "↑" button 72 to increase the setting or "↓" button 74 to decrease the setting. If "rSt" 104 is displayed and the user presses "↑" button 72 or "↓" button 74, a manual limit reset may be performed returning the option card to normal operating mode. In the illustrative example, to exit the "Installer" mode and return to the "Reading" mode, the user may do a 3-button hold while any of "HL" 100, "dFF" 102, and "rSt" 104 are displayed.

While the foregoing user interface has been shown as including a three digit, seven segment display and three buttons, it is contemplated that any suitable user interface may be used. For example, the user interface may include a touch screen, a liquid crystal display (LCD) panel and keypad, a dot matrix display, a computer, one or more buttons and/or any other suitable interface device, as desired.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

The invention claimed is:

1. A building appliance controller comprising:
   a control panel for controlling a building appliance, the control panel having a user interface;
   one or more option cards configured to communicate with the control panel and to provide additional functionality to the control panel, wherein the user interface of the control panel is configured to allow a user or technician to program, modify, and/or view one or more parameters of the one or more option cards; and
   wherein the control panel is configured to send to a selected option card one or more messages including an input at the user interface, and in response, the selected option card is configured to send to the control panel one or more messages including display information for the user interface of the control panel.

2. The building appliance controller of claim 1 wherein the user interface includes a fixed segment display and one or more buttons.

3. The building appliance controller of claim 2 wherein the input at the user interface includes the one or more buttons that have been pressed.

4. The building appliance controller of claim 2 wherein the display information includes the segments of the fixed segment display that are to be displayed.

5. The building appliance controller of claim 4 wherein the display information includes multiple pages of display information to be displayed, wherein the display displays one page at a time.

6. The building appliance controller of claim 4 wherein the display information includes a number of bytes corresponding to the number of digits of the fixed segment display, wherein each byte contains a number of bits, each bit corresponding to a different segment of a digit of the fixed segment display.

7. The building appliance controller of claim 1 wherein the control panel and the one or more option cards communicate over a Serial Peripheral Interface (SPI) connection.

8. The building appliance controller of claim 1 wherein the control panel only includes a top level menu for selecting between the one or more option cards that are currently in communication with the control panel.

9. A building appliance controller comprising:
   a control panel including a processor configured to provide a level of functionality to the controller;
   one or more option cards configured to communicate with the control panel and to provide additional functionality to the controller;
   wherein the control panel includes a user interface configured to allow a user or technician to program, modify, and/or view one or more parameters of the control panel and/or one or more option cards; and
   wherein the control panel is configured to display a top menu on the user interface indicating the one or more option cards that are currently connected to the control panel and, when one of the one or more option cards is selected via the top menu of the control panel, the control panel is configured to display one or more menus of the selected option card.

10. The building appliance controller of claim 9 wherein the one or more menus of the selected option card are stored in the selected option card and the option card sends the control panel messages that include display information.

11. The building appliance controller of claim 10 wherein the display information indicates the portions of the user interface that are to be turned on.

12. The building appliance controller of claim 11 wherein the user interface includes a fixed segment display and the display information identifies which segments of the fixed segment display to display.

13. The building appliance controller of claim 12 wherein a message including the display information includes a number of bytes corresponding to the number of digits of the fixed segment display, wherein each byte contains a number of bits, each bit corresponding to a different segment of the digit.

14. The building appliance controller of claim 9 wherein the one or more menus of the option card include parameter information of the selected option card.

15. The building appliance controller of claim 9 wherein the control panel sends the selected option card messages including an input at the user interface.

16. The building appliance controller of claim 9 wherein the control panel and the one or more option cards communicate over a Serial Peripheral Interface (SPI) connection.

17. A method of configuring an option card using a user interface of a control panel, wherein the option card is connected to the control panel via a communication interface, the method comprising:
    receiving a user input via the user interface of the control panel;
    sending one or more user input messages from the control panel to the option card across the communication interface, the one or more user input messages indicating the user input that was received via the user interface of the control panel;
    receiving the one or more user input messages at the option card, and in response, sending one or more display messages from the option card to the control panel via the communication interface, the one or more display messages indicating display information for display on the user interface of the control panel; and
    displaying the display information on the user interface of the control panel.

18. The method of claim 17 wherein the user interface includes a fixed segment display, and the display information includes the on/off state of each of the segments.

19. The method of claim 17 wherein the user interface includes one or more buttons and the one or more user input messages sent to the option card includes a button event.

20. The method of claim 17 wherein the control panel displays a menu for selecting between two or more option cards, and wherein a selected option card stores a menu that can be displayed on the user interface of the control panel when the option card is selected.

21. A building appliance controller comprising:
    a control panel for controlling a building appliance, the control panel having a user interface;
    two or more option cards configured to communicate with the control panel and to provide additional functionality to the control panel;
    the control panel is programmed to display a menu on the user interface of the control panel for selecting between the two or more option cards; and
    each of the two or more option cards includes a memory that stores menu parameters that can be displayed and accessed via the user interface of the control panel when the option card is selected.

* * * * *